United States Patent [19]
Horsley et al.

[11] 3,864,485
[45] Feb. 4, 1975

[54] SCRUBBER

[75] Inventors: Caperton B. Horsley, Wellesley; Edward F. Kent, Brockton, both of Mass.

[73] Assignee: Braxton Corporation, Medfield, Mass.

[22] Filed: May 14, 1973

[21] Appl. No.: 359,696

Related U.S. Application Data

[63] Continuation-in-part of Ser. No. 267,954, June 30, 1972, abandoned.

[52] U.S. Cl.................... 423/210, 23/261, 55/73, 55/94, 423/242
[51] Int. Cl............................................ B01d 53/14
[58] Field of Search............. 23/261; 55/73, 89, 90, 55/93, 94, 223, 233, 228; 261/22; 423/210, 242

[56] References Cited
UNITED STATES PATENTS

| | | | |
|---|---|---|---|
| 1,172,930 | 2/1916 | Brassert et al. | 55/90 |
| 2,858,903 | 11/1958 | Goetz et al. | 261/22 |
| 2,935,375 | 5/1960 | Boucher | 55/257 |
| 3,248,177 | 4/1966 | Grolee | 55/71 |
| 3,370,402 | 2/1968 | Nakai et al. | 55/73 |
| 3,499,731 | 3/1970 | Sackett | 55/257 |
| 3,518,812 | 7/1970 | Kolm | 55/89 |
| 3,572,264 | 3/1971 | Mercer | 261/116 |
| 3,708,958 | 1/1973 | Duty et al. | 55/90 |

*Primary Examiner*—Charles N. Hart
*Attorney, Agent, or Firm*—W. R. Hulbert

[57] ABSTRACT

Scrubbing apparatus having a treatment chamber with a straight portion of uniform cross section; a flow equalizing plate affixed across the entrance of the straight section to partially impede the stream and provide a pressure drop which compensates flow concentrating effects induced by structure upstream of the equalizing plate in the gas approaching the plate and equalizes the flow of the gas in the straight portion; and an array of sprayers for discharging the reactive liquid into the straight portion in drops uniformly distributed over the cross section of the portion, whereby said stream is equally exposed to the reactive liquid.

13 Claims, 7 Drawing Figures

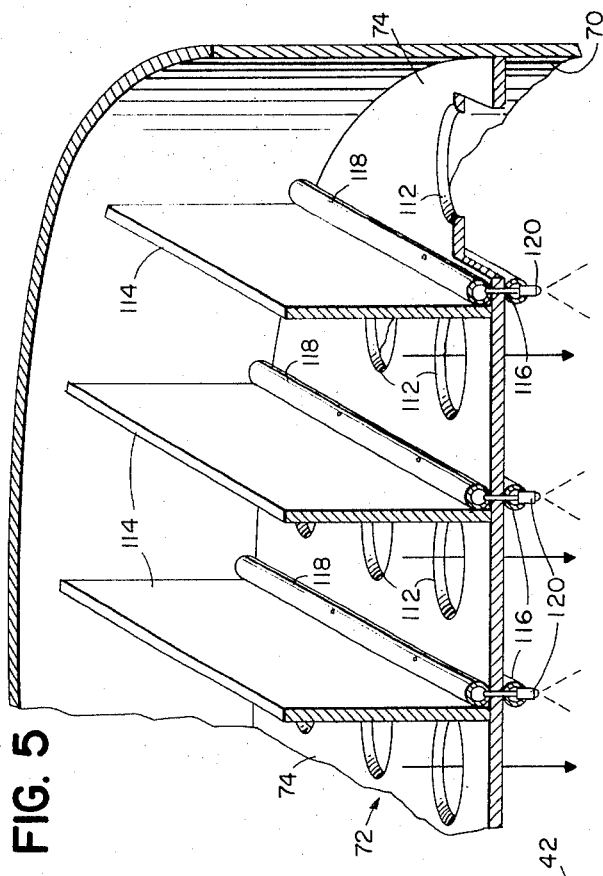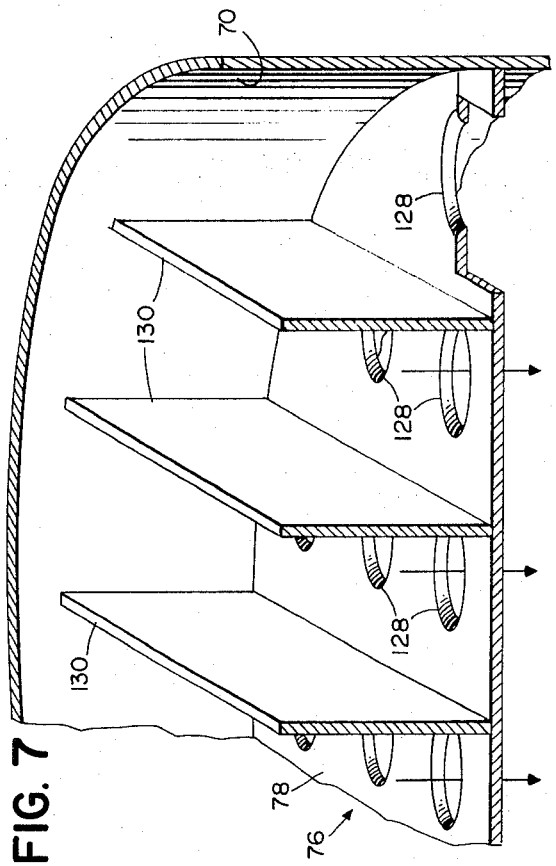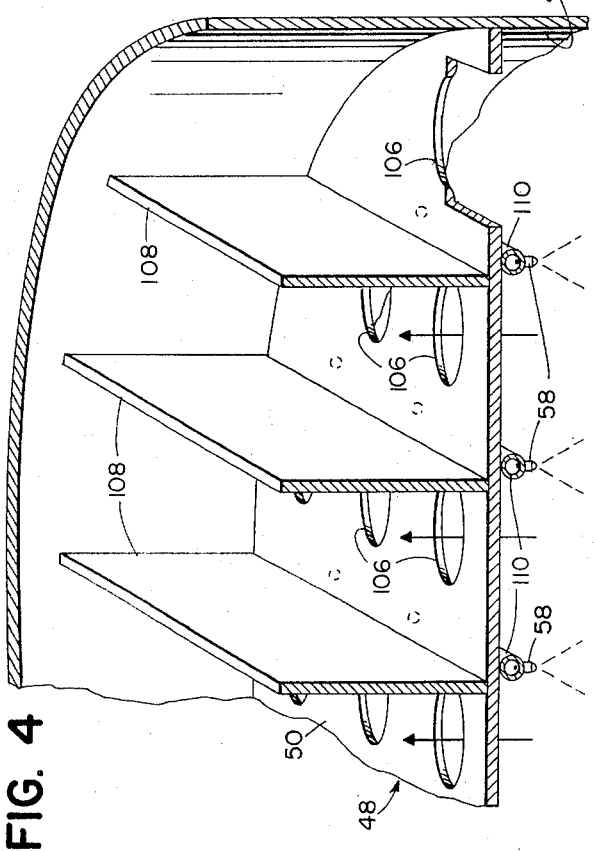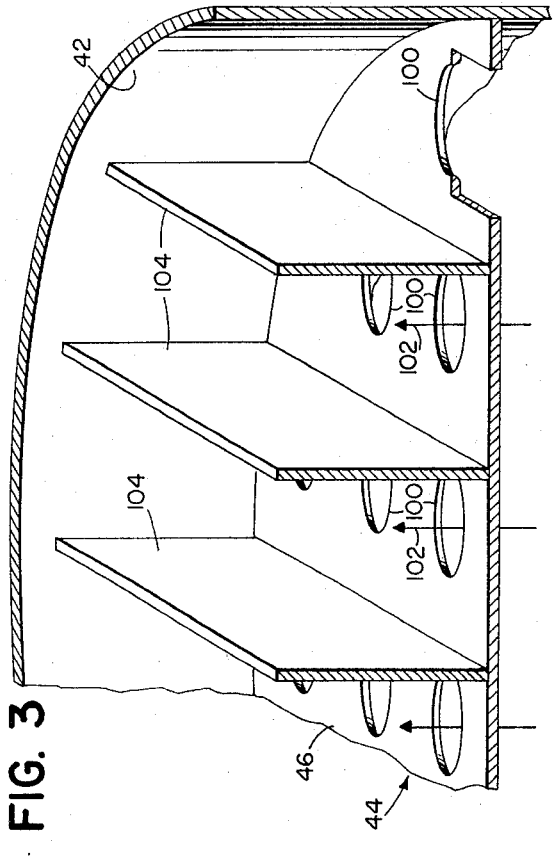

3,864,485

SCRUBBER

CROSS REFERENCE TO RELATED APPLICATION

This is a Continuation-in-Part of Application Ser. No. 267,954, filed June 30, 1972, now abandoned.

BACKGROUND OF THE INVENTION

This invention relates to scrubbers.

Scrubbers in which a reactive liquid is sprayed into a gas stream to react with and remove a component of the stream have frequently been used for treating gases. Solutions of alkaline materials dissolved in water have been used this way to remove sulfur dioxide from stack gas. The liquid effluent from such scrubbers containing the reaction products may not be acceptably discarded in many cases because of the water pollution hazard and therefore must be further processed to produce materials that can be reused or innocuously discarded. Processing costs are increased by inefficiencies due to non-uniformity in treating all parts of the stream.

In order to minimize the cost of processing scrubber effluent it is desirable to minimize the quantity of liquid effluent for a given stack gas throughput. It is also desirable to minimize the use of reactant chemicals and size of the reaction equipment used for the scrubbing operation, all while maintaining a high performance in the system in terms of collection efficiency for removal of the undesired component of the stream.

SUMMARY OF THE INVENTION

Objects of this invention include scrubbing a gas stream in a manner that results in high collection efficiency, minimizing the amount of reactant required to scrub a given volume of gas, minimizing the amount of vehicle carrying such reactants, minimizing the size and cost of the apparatus required for treating a given gas stream, providing a reaction product liquid effluent that is convenient and inexpensive to deal with, and providing apparatus which economically and reliably treats a gas stream to remove therefrom an unwanted component, as, for example, removing sulfur dioxide from stack gas.

The invention features scrubbing apparatus having a treatment chamber with a straight portion of uniform cross section; a flow equalizing plate affixed across the entrance of the straight section to partially impede the stream and provide a pressure drop which compensates flow concentrating effects induced by structure upstream of the equalizing plate in the gas approaching the plate and equalizes the flow of the gas in the straight portion; and an array of sprayers for discharging the reactive liquid into the straight portion in drops uniformly distributed over the cross section of the portion, whereby said stream is equally exposed to the reactive liquid.

A preferred embodiment of the invention features operation of the sprayers to produce drops of a size entrained in the gas stream and particularly of a diameter predominantly less than 0.005 centimeters; the use of an isolating plate affixed across the outlet of the straight uniform portion of the treatment chamber, the isolating plate partially impeding the flow of said stream to produce a pressure drop varying across the plate and compensating flow disturbing effects of structure downstream of the isolating plate and isolating flow within the uniform portion from pressure variations generated by downstream structure; supplying the sprayers with reactive constituent at a rate close to stoichiometric ratio to said stream; discharging through said sprayers an alkaline chemical in a volatile vehicle to react with sulfur dioxide in a stack gas stream; treating the gas stream prior to introduction into the treatment chamber in a saturator chamber supplied with the volatile vehicle for evaporation into and saturation of the stream before it enters into the treatment chamber with the vapor of the vehicle; the sprayers having the reactive constituent dissolved in the vehicle close to its limit of solubility. Other objects, features, and advantages will appear from the following description of a preferred embodiment of the invention taken together with the attached drawings.

BRIEF DESCRIPTION OF THE DRAWING

FIG. 3 shows in perspective cut-away view the equalizing plate shown at the entrance to the saturator chamber in FIG. 2.

FIG. 4 shows in perspective cut-away view the isolating plate shown at the exit of the saturator chamber in FIG. 2.

FIG. 5 shown in perspective cut-away view the equalizing plate shown at the entrance to the treatment chamber in FIG. 2.

FIG. 7 shows in perspective cut-away view the isolating plate shown at the exit of the treatment chamber in FIG. 2.

DESCRIPTION OF THE PREFERRED EMBODIMENT

Figure 1:
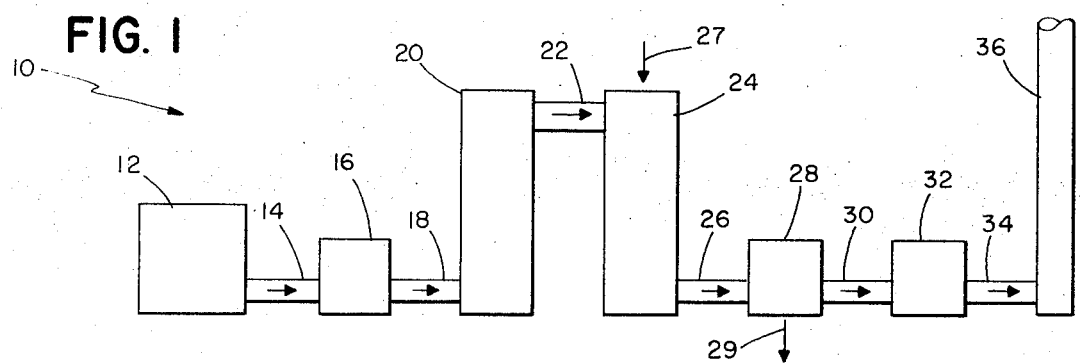
FIG. 1 shows a flow diagram of equipment for processing stack gas according to the invention.

Gas treating apparatus 10 for removing sulfur dioxide from stack gas is shown generally in FIG. 1 and includes fire box 12 generating a stream of combustion products which are conveyed through duct 14 to dry cyclone 16. From cyclone 16 the stream is conveyed through duct 18 to saturator chamber 20 and thence through duct 22 to treatment chamber 24. From treatment chamber 24 the gas stream is conveyed through duct 26 to wet cyclone 28, thence through duct 30 to an exhaust fan 32, and thence to duct 34 leading to stack 36 from which it is discharged.

Reactive liquid, which in the preferred embodiment may advantageously be an alkaline chemical such as $Na_2CO_3$ in a saturated solution, is introduced into treatment chamber 24 through line 27, and reaction products are removed from cyclone separator 28 through line 29. The reaction products in the preferred embodiment will be a solution of $Na_2SO_3$ with some residual $Na_2CO_3$. A quantity of $Na_2SO_4$ may also be present resulting from oxidation of sulfur.

Figure 2:
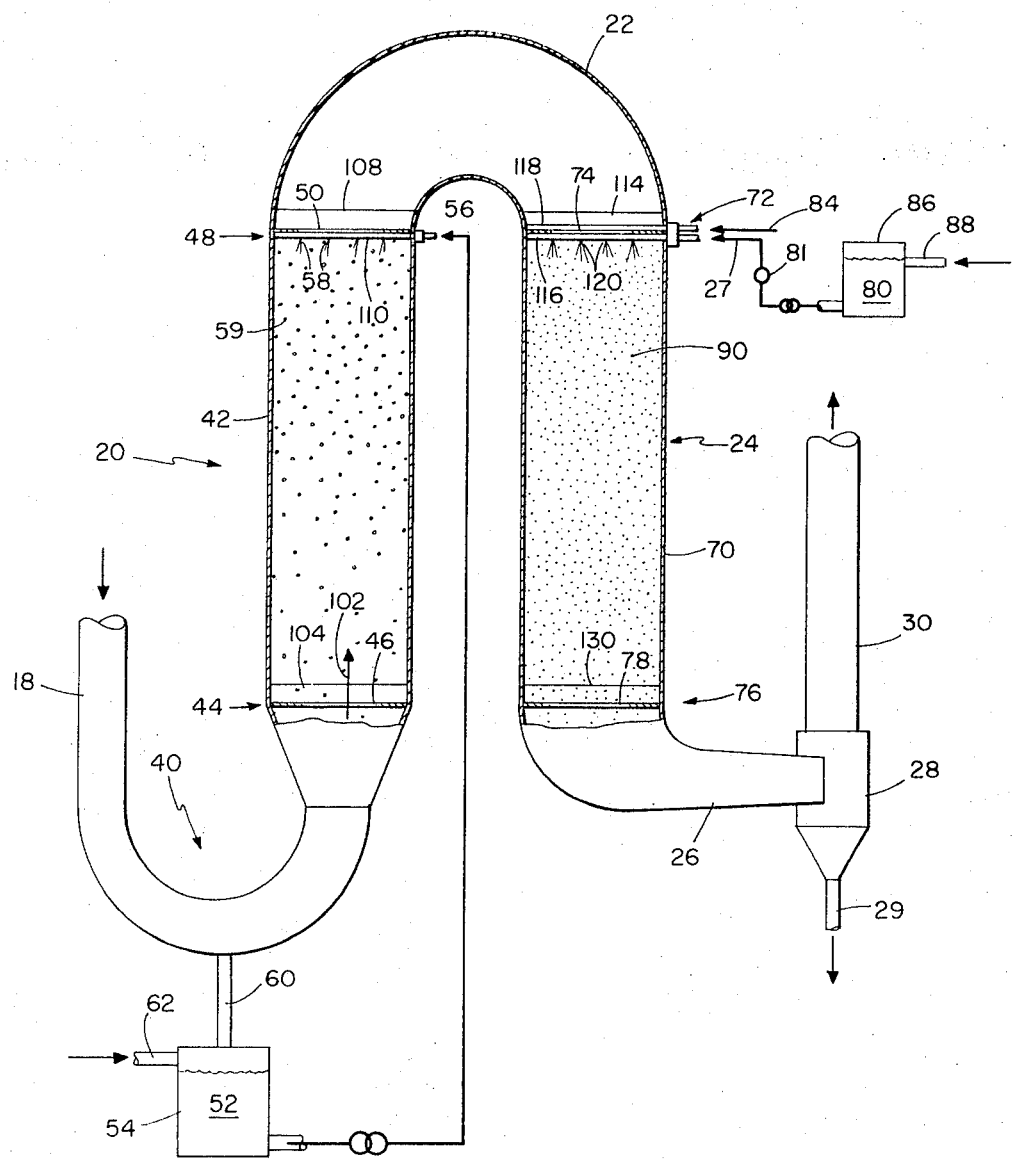
FIG. 2 shows somewhat schematically the saturator chamber and the treatment chamber shown in FIG. 1.

Referring now particularly to FIG. 2, saturator chamber 20 has entrance section 40, leading the gas stream to straight section 42 of uniform cross section. At entrance 44 to straight section 42, equalizing plate 46 is affixed. At exit 48 of the straight portion 42, isolation plate 50 is affixed. Plates 46 and 50 will be described in greater detail hereafter in connection with similar plates in treatment chamber 24. Volatile vehicle 52 (water in the preferred embodiment) stored in tank 54 is pumped through line 56 to spray nozzles 58 supported on plate 50. Drain 60 connects the low point of entrance section 40 to tank 54 to return any fluid collecting at the bottom of chamber 20 to the tank. Line 62 is connected to tank 54 to supply makeup water. The effluent from saturator chamber 20 is connected through duct 22 to treatment chamber 24 which has a straight portion 70 of uniform cross section. Across entrance 72 of portion 70 flow equalizing plate 74 is affixed, and across exit 76 of portion 70 isolating plate 78 is affixed. Air atomizing nozzles 120 are supported on plate 74 and supplied by reactive liquid 80 (a solution of sodium carbonate in water in the preferred embodiment) through metering valve 81 and line 27 and by compressed air through line 84. Tank 86 stores the reactive liquid 80 and is replenished through line 88. Spray nozzles 120 produce small drops of reactive liquid 90, which are discharged into chamber portion 70.

Flow equalizing plate 46, affixed at entrance 44 of straight portion 42 of saturator chamber 20, is shown more particularly in FIG. 3. Plate 46 has an array of orifices 100 penetrating the plate for passage of the stack gas as shown by arrows 102. Stiffening ribs 104 are affixed to the downstream face of plate 46 running between orifices 100.

Isolation plate 50 is affixed at the exit of straight portion 42, shown particularly in FIG. 4. Plate 50 has orifices 106 similar to those of plate 46 and attached stiffening ribs 108 aligned perpendicular to the turning axis of duct 22. Vehicle distribution conduits 110 are affixed to the upstream face of plate 50 running between orifices 106 and are connected to be supplied by line 56. Spray nozzles 58 are mounted in and connected to conduits 110 in centered positions on the diagonals between orifices 106. Nozzles 58 are advantageously of the single fluid-pressure atomizing type producing typically drops about 0.02 cm in diameter.

Flow equalizing plate 74, affixed at entrance 72 of the straight portion 70 of treatment chamber 24, is shown more particularly in FIG. 5. Plate 74 has an array of orifices 112 penetrating the plate and attached stiffening ribs 114 aligned perpendicular to the turning axis of duct 22 and running between the orifices 112. Reactive liquid distribution conduits 116 are affixed to the downstream face of plate 74 running between orifices 112 and are connected to be supplied with reactive liquid from line 27. Atomizing gas distribution conduits 118 are affixed to the upstream face of plate 74 in positions directly opposed to conduits 116 and are connected to be supplied with atomizing gas—compressed air in the case of the preferred embodiment—from line 84. Two-fluid type spray nozzles 120 are affixed to conduits 116 and positioned at the center of diagonals between orifices 112.

Figure 6:
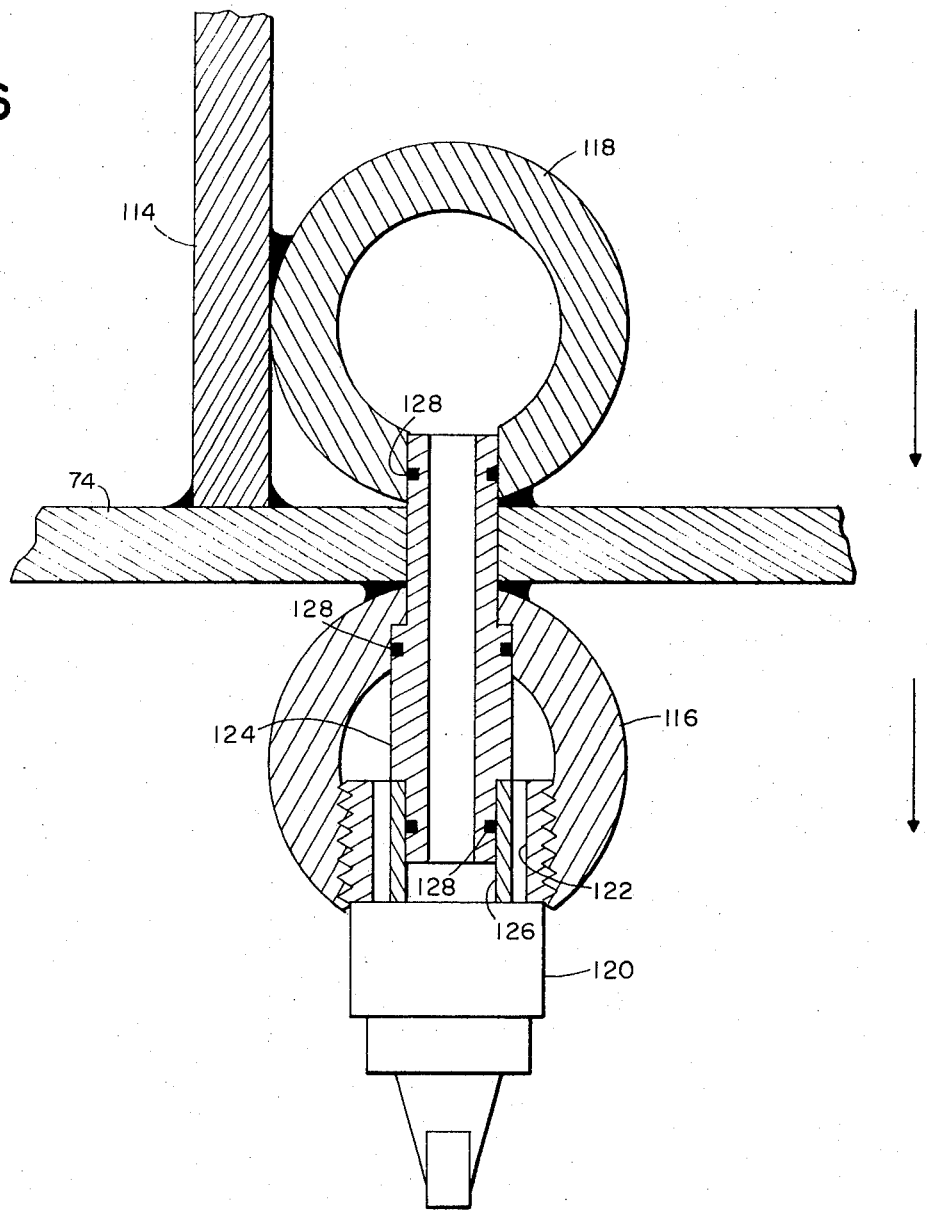
FIG. 6 shows in cross section a spray nozzle affixed to the equalizing plate shown in FIG. 5.

Nozzles 120 are connected as more particularly shown in FIG. 6. Nozzle 120 is secured into a threaded fitting in conduit 116 so that outer channel 122 is connected with the interior of conduit 116. Connector 124 passes through the top of conduit 116, plate 74, and the bottom of conduit 118 and establishes a connecting passage between the interior of conduit 118 and the central channel 126 of nozzle 120. O-rings 128 seal connector 124 to conduits 116, 118, and channel 126.

Isolation plate 78, as shown particularly in FIG. 7 has orifices 128 and attached stiffening ribs 130 arranged in much the same manner as those described for plate 46. It should be noted that in all cases orifices 100, 106, 112, and 128 have rounded edges on their upstream faces and sharp edges on the downstream faces to make a smoother and less turbulent flow.

Considering first the overall operation of the preferred embodiment, combustion products from firebox 12 flow to dry cyclone 16 where most of the larger fly ash particles are removed from the stream. The stream then flows to saturator chamber 20 where the stack gas is exposed to a spray of water drops with the result that the stream is cooled and saturated with water vapor. From saturator chamber 20 the stack gas flows to treatment chamber 24 where it is exposed to a spray of sodium carbonate solution which absorbs the sulfur dioxide from the gas, releasing some carbon dioxide. From treatment chamber 24 the gas flows to wet cyclone 28 where entrained drops are removed from the stream. The stream then flows through fan 32 to stack 36 from which it is exhausted.

The operation of the saturator and treatment chambers will now be considered in greater detail. The stream of stack gas entering saturator chamber 20 through curved entrance section 40 will be impelled by centrifugal force towards the outermost portion of section 40 with the result that the flow and pressure will be slightly higher towards the outside curve of the section. In the absence of flow equalizing plate 46, the higher velocity flow at the outside of section 40 would be perpetuated into straight section 42 of chamber 20 with the result that the flow would not be of equal velocity through section 42. However, with equalizing plate 46 affixed in accordance with the invention across entrance 44 to straight portion 42, the flow is partially impeded by the plate and a pressure drop develops between the upstream and downstream faces of the plate. This pressure drop is somewhat greater across the portions of the plate at which the higher velocity flow is directly—namely, towards the right side where the flow from the outer part of entrance section 40 is directed, with the result that the gradient in the pressure drop diverts some of the flow towards the left (as viewed in FIG. 2) and so compensates the flow concentrating effects of the upstream structure and equalizes the flow in straight section 42. The details of the structure upstream from entrance 44 will of course vary from installation to installation, but any structure other than a long straight entrance duct of cross section equal to that of the chamber (and such an entrance is usually impractical) will have flow concentrating effects of one sort or another. Whatever the upstream flow concentration, the flow equalizing plate will generate a higher pressure drop in front of the highest velocity flow to divert a part of the flow so as to equalize the downstream flow in the straight portion of the chamber. The size and number of the orifices in the equalizing plate are advantageously chosen in relation to the flow and cross section so that the pressure drop from the upstream face to the downstream face is at least several times the transverse pressure difference produced by the upstream entrance structure.

The operation of isolating plate 50 at the exit to section 42 is somewhat different. Curved duct 22 interacts with the flowing stack gas to produce pressure gradients transverse to the curved axis of the duct. In particular, the pressure will be somewhat higher towards the outside of the curve. In the absence of isolating plate 50, the pressure perturbations from curving duct 22 would extend into straight portion 42 of chamber 20 and there produce non-uniform flow across the cross section. With isolating plate 50 affixed across the exit of section 42 in accordance with the invention, the flow is partially impeded at the plate and a pressure drop is produced between the upstream and downstream faces of the plate. This pressure drop will vary somewhat in the transverse direction across the plate to compensate the pressure effects from the downstream structure and will effectively isolate the flow within section 42 from the pressure perturbation generated by the downstream structure. Flow equalizing plate 46 and isolation plate 50 thus cooperate to produce a very homogeneous flow within the straight section 42.

Pressure atomizing spray nozzles 58, as shown in FIG. 4, discharge into chamber 20 a spray of the liquid used as the vehicle in treatment chamber 24 (i.e., water in the preferred embodiment). The nozzles discharge a spray with drops typically having diameters in the range 0.01 to 0.1 cm. These drops will fall downward through the rising stack gas, evaporating as they proceed and saturating the gas with the vapor of the vehicle. The excess of unevaporated drops that reaches the bottom of chamber 20 is collected at drain 60, cleaned of entrained smoke particles to the extent necessary to prevent plugging of nozzles 58, and then returned to tank 52 for recirculation. Nozzles 58 are arranged on the bottom of plate 50 in a pattern producing a uniform distribution of drops across the cross-section of chamber 20. Because of the uniform distribution of spray and the equalized flow of stack gas through the chamber, the stack gas is uniformly exposed to the evaporating drops and becomes uniformly saturated with the vapor evaporated from the volatile liquid vehicle. Because of the uniformity of treatment of all parts of the gas stream, very little excess liquid is required so that recirculation is minimized.

Turning now to the operation of treatment chamber 24, equalizing plate 74 and isolating plate 78 at the entrance and exit respectively of straight portion 70 operate in essentially the same manner as the corresponding structures associated with saturator chamber 20 to produce an equalized flow of stack gas through section 70. Two-fluid type spray nozzles 120 produce sprays of fine drops (diameters predominantly less than 0.005 cm) which are discharged uniformly across the cross-section of section 70. Because the nozzles are mounted on the downwstream face of plate 74, they spray directly into the straight portion 70 without wetting the plate. The small drops produced by nozzles 120 are entrained in the stack gas so that each drop has insignificant motion relative to the surrounding gas as it moves through chamber 24. The liquid making up the drops in chamber 24 has a constituent reactive with the component to be removed from the stack gas carried in a volatile vehicle—sodium carbonate dissolved in water in the preferred embodiment. As the stack gas with entrained drops passes through chamber 24, sulfur dioxide molecules diffuse to the surface of the drops as a result of their molecular motion. On reaching the drop surface, the sulfur dioxide reacts with the sodium carbonate in solution to form sodium sulfite with the release of carbon dioxide gas. Because of the close spacing between the drops, the distance that any sulfur dioxide molecule must diffuse through the gas is short and the removal of the sulfur dioxide is accordingly very rapid. At the same time, however, because the drops are very small, the total amount of liquid discharged in the spray can be small even with close spacing between drops. The previous saturation of the stack gas with the vehicle (i.e., water) carrying the reactant chemical, which took place in the saturator chamber, advantageously prevents evaporation to dryness of these small drops. The equalized flow in the chambers together with the uniformity of drop discharge across the cross-section ensures a uniform treatment of all the stack gas. The equalized flow is especially important in order to achieve uniform exposure in the treatment chamber in view of the immobility of the small drops with respect to the entraining fluid. With the equalized flow achieved by use of the equalizing and isolation plates, it is possible to adjust the rate at which solution is sprayed into the treatment chamber to provide an amount of the reactant chemical close to the stoichiometric ratio required for complete reaction with the sulfur dioxide (or other gas to be removed) and still accomplish complete treatment of all parts of the stream. The amount of liquid sprayed into the chamber is thus minimized. A further factor contributing to the minimization of spray quantity is that the liquid sprayed into the treatment chamber is close to saturated with the reactant chemical.

After passage through the treatment chamber, the stack gas, now cleansed of its sulfur dioxide and with the entrained drops now containing predominantly a solution of sodium sulfite, pass to cyclone separator 28 where the drops are removed from the gas stream and discharged through conduit 29 which the stack gas flows out through duct 30.

Dimensions and operating parameters for one installation employing the invention are as follows. Stack gas at inlet to saturation chamber.
Composition:

| | |
|---|---|
| $N_2$ | 76.2% |
| $CO_2$ | 14.2% |
| $H_2O$ (vapor) | 6.0% |
| $O_2$ | 3.4% |
| $SO_2$ | 0.2% |

Flow: 100,000 acfm
Temperature: 300° F
Water supply to saturator chamber.
Sprayed: 30 gpm
Recirculated: 5 gpm
Stack gas at inlet to treatment chamber.
Flow: 81,500 acfm
Temperature: 120° F
Spray feed to treatment chamber.
36 lb/min of $Na_2CO_3$ dissolved in 85 lb/min water.
(1.1 times stoichiometric)
Diameter of chambers: 12 ft.
Length of chambers (between equalizing and isolation plates) 40 ft.
Plate construction: 100 orifices 8 inches diameter.
Residence time in treatment chamber: 3 sec.

The invention as described above advantageously achieves contact between the molecules of the undesired gas component and the absorbing drops within a minimum time interval by dispersing the drops at close intervals within the gas stream; prevents inadequate treatment of any part of the stream by equalizing the flow in the treatment chamber and uniformly distributing the drops therein; minimizes the volume of reactive liquid by employing very small drops; prevents these small drops from evaporating by presaturating the stream with the vapor of the vehicle in which the reactant is carried. Alkaline chemicals other than sodium carbonate may be used to remove sulfur dioxide from stack gas and the reactant chemicals may be introduced in the treatment chamber either in concentrated solutions or as a slurry. Gas streams other than stack gas may also be processed employing appropriate reactant chemicals. These and other embodiments will be readily apparent to those skilled in the art.

What is claimed is:

1. Scrubbing apparatus for treating a stream of stack gas with an alkaline chemical to remove sulfur dioxide therefrom comprising a treatment chamber with a straight reaction portion of uniform cross-section having an inlet and an outlet for said stream, said portion being free of flow disturbance therein, a flow equalizing plate with orifices therein affixed in said treatment chamber across the inlet of said straight portion, said equalizing plate partially impeding said stream and producing a pressure drop greater than pressure differences transverse to the flow direction, said pressure drop having a gradient transverse to the flow direction of the stack gas compensating flow concentration by structure upstream of said equalizing plate to equalize the flow in said straight portion, an isolating plate with orifices therein, affixed in said treatment chamber across the outlet of said straight portion, said isolating plate partially impeding said stream and producing a pressure drop greater than pressure differences transverse to the flow direction, said pressure drop produced by the isolating plate having a gradient transverse to the flow direction compensating pressure variations produced by structure downstream of said isolating plate to isolate flow within said straight portion from flow concentrating effects of downstream structure, sprayers supported in said chamber at the inlet to said straight section and connected to a supply of said alkaline chemical dissolved in water close to its limit of solubility, said sprayers discharging a spray of drops predominantly less than 0.005 cm diameter uniformly distributed across the cross-section of said straight section, said sprayers discharging said alkaline chemical at a rate close to stoichiometric ratio to the sulfur dioxide in said stream, a saturator chamber connected to said treatment chamber upstream thereof for saturating said stream with water vapor prior to entry into said treatment chamber, and equipment connected to said treatment chamber downstream thereof for removing drops from said stream.

2. In scrubbing apparatus for removing from a gas stream a gaseous component by exposing said stream to drops of a liquid reactive with said gaseous component, said apparatus including a supply for said liquid and a treatment chamber in which said drops make contact with said stream, the improvement comprising a straight reaction portion of said treatment chamber with an entrance through which said stream enters and an exit through which said stream exits and with a uniform cross section between said entrance and said exit, said portion being free of flow disturbance, a flow equalizing plate affixed across said straight portion at its entrance with orifices distributed thereon for delivery of said stream into said portion, said plate partially impeding said stream to provide a pressure drop from one face of said plate to the other, said pressure drop having a gradient transverse to the flow direction compensating flow concentrating effects induced in the gas stream approaching said plate by structure upstream of said equalizing plate, and equalizing the flow of said gas stream in said straight portion, and dispersive means for dispersing said reactive liquid uniformly through said gas in drops spaced for effective diffusive interaction with said gaseous component, said means being connected to said supply and positioned to discharge said liquid into said straight portion.

3. Apparatus as claimed in claim 2, said sprayers being supported on the downstream face of said equalizing plate between said orifices and directing discharge of said liquid away from said equalizing plate to discharge said drops into said straight portion of uniform cross section without wetting said equalizing plate with said liquid.

4. Apparatus as claimed in claim 2, said sprayers producing drops of a size entrained in said stream.

5. Apparatus as claimed in claim 2 said drops being predominantly less than 0.005 cm diameter.

6. Apparatus as claimed in claim 2 including an isolating plate affixed across said exit of said straight, uniform portion, said isolating plate having orifices therethrough for exiting of said stream from said straight, uniform portion, said isolating plate partially impeding the flow of said stream to produce between its faces a pressure drop with a gradient transverse to the direction of flow compensating pressure variations produced by structure downstream of said isolating plate to isolate flow within said straight uniform portion from effects of downstream structure.

7. Apparatus as claimed in claim 2, including delivery means supplying said diffusive means with said reactive constituent at a rate close to stoichiometric ratio to said gaseous component.

8. Apparatus as claimed in claim 2, said liquid including a volatile vehicle and a reactive constituent dispersed therein, in combination with a saturator chamber connected to process said stream before it enters into said treatment chamber, said saturator chamber being supplied with said volatile vehicle without said reactive constituent dispersed therein for evaporation into and saturation of said stream with vapor of said vehicle before it enters into said treatment chamber.

9. Apparatus as claimed in claim 8, including delivery means supplying said sprayers with liquid having said reactive constituent dissolved in said vehicle at a concentration close to the limit of solubility.

10. A method for removing from a stream of gas a gaseous component comprising the steps equalizing the flow of said gas across the cross section of a treatment chamber by partially impeding its flow with an equalizing plate having orifices distributed therethrough, dispersing reactive solution into the gas stream downstream of said plate in drops of a size to be entrained and uniformly distributed over the cross section of said treatment chamber, moving said gas together with said dispersed drops in undisturbed flow through a portion of said treatment chamber that is straight, of uniform cross section and free of flow disturbance, while moving molecules of said gaseous component to the surfaces of said drops predominantly by molecular diffusion, reacting said gaseous component molecules as they reach said drops, and removing said drops from said gas.

11. A method as claimed in claim 10, said reactive solution being supplied at a rate close to the stoichiometric ratio for reaction with said component.

12. A method as claimed in claim 10 including the step of saturating said gas prior to dispersal of said reactive solution therein with the solvent of said solution.

13. A method as claimed in claim 12, said reactive solution having reactant dissolved therein to its limit of solubility.

* * * * *